United States Patent [19]
Dickison

[11] Patent Number: 5,839,394
[45] Date of Patent: Nov. 24, 1998

[54] SAFETY LEASH

[75] Inventor: Darius Dickison, Simi Valley, Calif.

[73] Assignee: Eagle West Enterprises, Simi Valley, Calif.

[21] Appl. No.: 396,750

[22] Filed: Mar. 1, 1995

[51] Int. Cl.⁶ .................................................. A01K 27/00
[52] U.S. Cl. ......................................................... 119/795
[58] Field of Search ................................... 119/795, 769, 119/770, 771, 792, 772, 796

[56] References Cited

U.S. PATENT DOCUMENTS

| | | | |
|---|---|---|---|
| D. 337,395 | 7/1993 | Erlinger et al. ...................... | 119/795 X |
| 4,269,150 | 5/1981 | McCarthy ................................ | 119/796 |
| 4,541,364 | 9/1985 | Contello .................................. | 119/772 |

FOREIGN PATENT DOCUMENTS 93445  11/1983  European Pat. Off. ............... 119/796

*Primary Examiner*—Thomas Price
*Attorney, Agent, or Firm*—Gilbert Kivenson

[57] ABSTRACT

A safety leash incorporating a shock absorbing handle and an automatically releasing wrist strap. The shock absorbing action is obtained by a combination of air compression and the flexing of a resilient member. The automatic releasing feature takes advantage of a wrist strap held onto the leash handle by a Velcro® (proprietary self adhering cloth) which releases if the force on the dog owner's arm exceeds a predetermined amount.

2 Claims, 2 Drawing Sheets

SAFETY LEASH

INTRODUCTION

The present invention relates to a safety leash for dogs. It is often the case that a large dog on a walk with a slight owner will be aroused by a cat or other dog and will start a chase. This will produce a sudden tug on the leash thereby creating enough force to cause a sprain or even topple the owner. This problem has been recognized in the prior art. Lacey for example(U.S. Pat. No. 4,903,638) employs a pair of jaws which clip to the dog's collar and a cable which extends along the leash to a handle. A tug on the cable will unleash the dog but a finite reaction time is required during which damage can be done. Bonilla (U.S. Pat. No. 5,125,365) uses a hollow, flexible cable as a leash and a concentric inner cable to actuate a latch in the collar. There is less lag in this system but human reaction time can still result in harm because the owner must actuate the inner cable.

OBJECTIVES

Many leashes now in use are equipped with crude grips which are uncomfortalbe when used for an extended period especially with a large or spirited dog. It is one objective of the present invention to provide a comfortable handle which also embodies a damping system so that surges do not have a considerable effect on the owner's hand and arm.

It is a second objective of the present invention to provide a relatively simple, automatic release system to disconnect the leash after a fixed impulse level is reached. This system is inexpensive and easily resettable in the field.

SUMMARY OF THE INVENTION

The present invention utilizes a two piece grip in which a flexible, finger-indexed, moveable portion fits over a notched stationary extension. The combination of compressed air trapped in the notches and the flexibility of the moveable portion provides a shock absorbing action to smooth out repeated pulsations of the leash. Attached to the outside frame of the handle is an auxiliary loop through which the owner places his wrist prior to grasping the handle. The auxiliary loop is attached to the handle by a Velcro® (proprietary self adhering cloth) coupling. Should the force on the leash become so great as to wrest the handle from the owner's grip, the leash handle will be retained by his wrist. If the force increases further, the handle will separate from the auxiliary loop at the Velcro® (proprietary self adhering cloth) junction, freeing the animal and preventing harm to the owner.

DETAILED DESCRIPTION OF THE INVENTION

The present invention will be described with reference to FIGS. 1–4.

Figure 1:
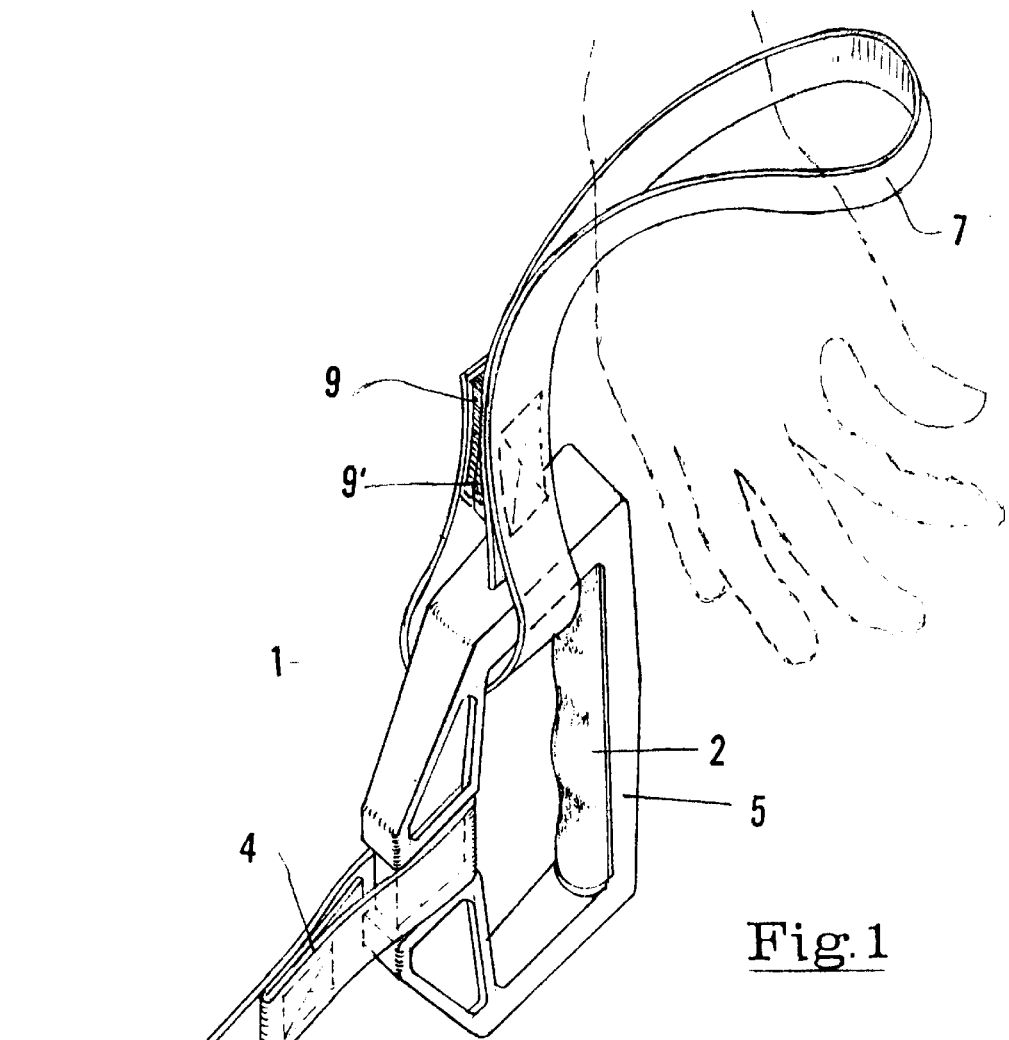
FIG. 1 is a perspective view of the leash handle and auxiliary wrist loop.
Figure 2:
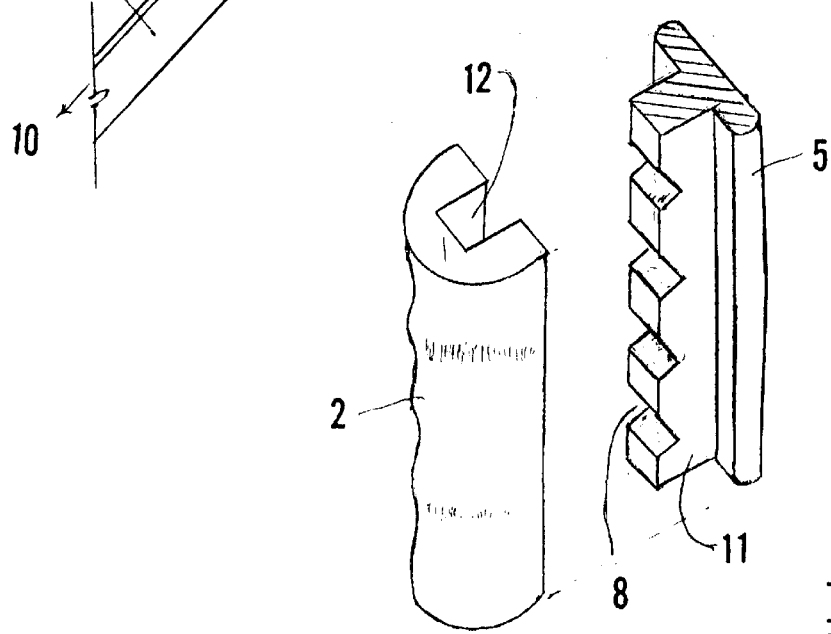
FIG. 2 is an exploded view of the handle showing the grooved, flexible grip and the notched extension for receiving the grip.

FIG. 1 shows the general features of the handle 1 which incorporates an elastic, finger indexed grip 2, a rigid back 5, an auxiliary loop 7 and conventional leash 3. The other end of leash 3 is connected to the dog collar. FIG. 2 shows the construction of the grasping part of the handle. The rigid back 5 is "T" shaped and includes the notched extension 11. The finger indexed grip 2 is slotted at 12 to fit tightly over extension 11. When the finger-indexed grip 2 is in place, each finger indentation is directly over a corresponding notch 8. A small amount of air is trapped in each notch. A sudden tug on the leash when the handle is grasped will cause compression of the air. This, coupled with the flexibility of grip 2, will act as a shock absorber and cushion the effect of sudden tugs on the hand and arm of the person using the leash.

Figure 3:
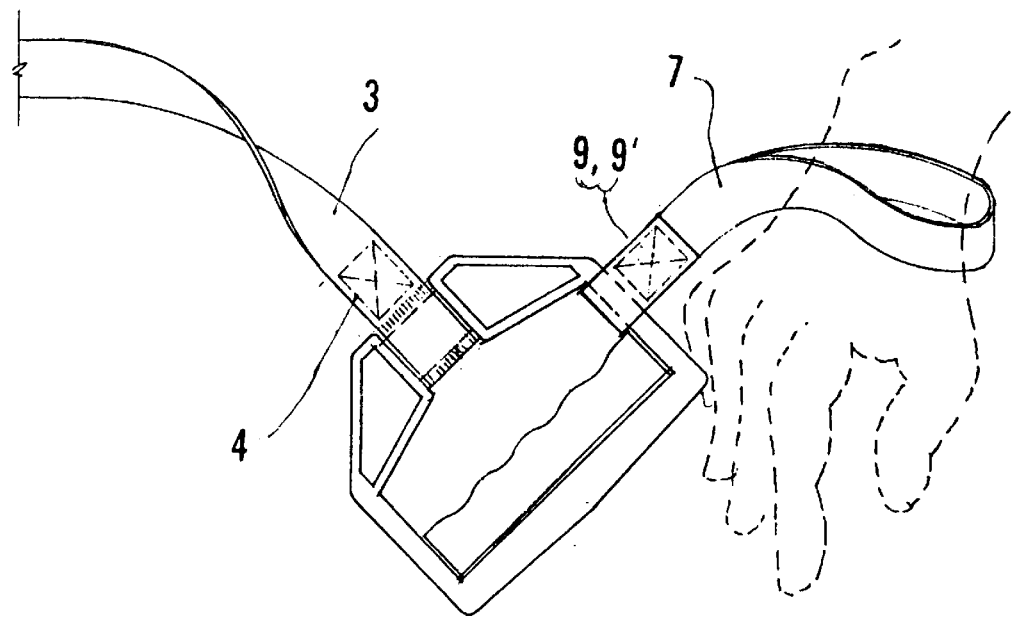
FIG. 3 is a side view of the auxiliary wrist loop releasing mechanism.
Figure 4:
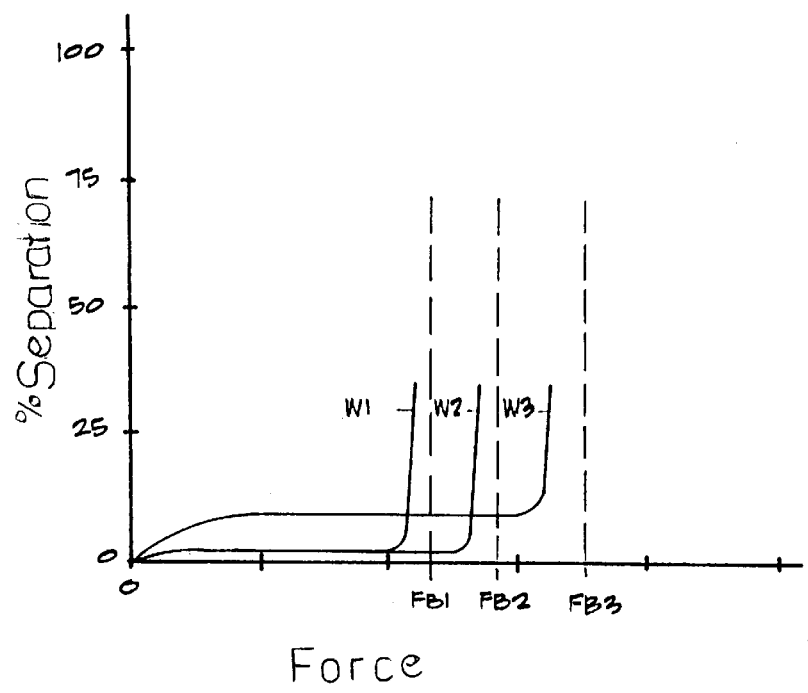
FIG. 4 is a graph of the percentage of separation of the loop from the handle as a function of force applied and the width of the Velcro coupling.

The safety release feature of the invention is shown in FIGS. 1 and 3. The auxiliary loop 7 is attached to the upper part of handle 1 by the strips 9 and 9' made of the material Velcro® (proprietary self adhering cloth) which is the trade name for a cloth which incorporates two kinds of surfaces. One surface is covered by hooks, the other by loops. Pressing one surface on the other causes the hooks to adhere to the loops and to make a junction which is relatively resistant to separation in the shear mode. One strip of Velcro® (proprietary self adhering cloth) is joined to the end of loop 7; a strip of the opposite kind is cemented to one surface of the loop a short distance from the end so that the auxiliary loop may be temporarily closed as shown in FIG. 1. The user first inserts his hand through loop 7 and then grasps the handle. Should his grip subsequently be overcome so that he must release the handle, it would swing down as shown in FIG. 3. The leash would now be attached to the user's arm only by loop 7 on his wrist. The handle 1 is now in the position where the Velcro strips 9 and 9' will be in the "peeling" position, their weakest separation mode. If the force increases further, the strips 9 and 9' will start to separate and continue to do so until the handle is completely separated from the user. He will not be dragged by the leash. This action is shown graphically in FIG. 4. The initial build-up of force serves to straighten the leash and align handle 1 so that strips 9 and 9' are ready to separate in the peeling mode. Further increase of force then peels the strips from each other until they are completely separated. The amount of force required to release the handle can be controlled by the width of the Velcro® (proprietary self adhering cloth) strips. This is shown in FIG. 4 where $w_1$, $w_2$ and $w_3$ are successively greater widths which produce increasing release forces.

What is claimed is the following:

1. A shock absorbing, automatically releasing dog leash holder comprised of:
   a. a releasable loop through which a dog owner initially places his wrist;
   b. a handle to which said releasable loop and a dog leash are attached;
   c. notches in part of the handle;
   d. an elastic, grooved, semi-cylindrical, finger-indexed body which slides over said notches to form a grip and to trap air in said notches;
   whereby grasping of the handle compresses the air in the notches which serves to absorb any shocks caused by sudden tugs from the dog leash.

2. A shock absorbing, automatically releasing dog leash holder as described in claim 1 in which said releasable loop utilizes a Velcro® joint to open and free the owner's wrist if a sudden, excessive tug is exerted on the leash.

* * * * *